(12) United States Patent
Pistel

(10) Patent No.: US 7,898,111 B1
(45) Date of Patent: Mar. 1, 2011

(54) POWER SUPPLY METHODS AND SYSTEMS

(75) Inventor: Chris Pistel, Harwich, MA (US)

(73) Assignee: Network Engines, Inc., Canton, MA (US)

( * ) Notice: Subject to any disclaimer, the term of this patent is extended or adjusted under 35 U.S.C. 154(b) by 266 days.

(21) Appl. No.: 12/136,457

(22) Filed: Jun. 10, 2008

(51) Int. Cl.
*H02J 3/16* (2006.01)

(52) U.S. Cl. .......................................... 307/82

(58) Field of Classification Search ............ 307/82; 323/205–211; 322/20
See application file for complete search history.

(56) References Cited

U.S. PATENT DOCUMENTS

| 4,038,559 | A | 7/1977 | Chun et al. |
| 5,790,394 | A | 8/1998 | Cabaniss et al. |
| 5,811,889 | A | 9/1998 | Massie |
| 6,525,435 | B2 * | 2/2003 | Lau et al. ......................... 307/52 |
| 6,867,634 | B2 * | 3/2005 | Aiello et al. .................... 327/335 |
| 7,307,857 | B2 * | 12/2007 | Liu et al. .......................... 363/16 |
| 7,450,408 | B2 * | 11/2008 | Tan et al. ....................... 363/132 |
| 7,696,704 | B2 * | 4/2010 | Ger et al. ....................... 315/312 |
| 2006/0019629 | A1 | 1/2006 | Berson et al. |

* cited by examiner

*Primary Examiner* — Albert W Paladini
(74) *Attorney, Agent, or Firm* — Nutter McClennen & Fish LLP; David J. Powsner

(57) ABSTRACT

The invention provides, in some aspects, a power supply that includes a first rectifier circuit configured to receive a first AC input and to generate a first DC output, a second rectifier circuit configured to receive a second AC input and to generate a second DC output, and a storage unit (e.g., a capacitor) configured to store charge from both the first DC and the second DC outputs. The storage unit can itself be configured to supply that stored charge as DC power, e.g., to a computer or other coupled device.

20 Claims, 4 Drawing Sheets

POWER SUPPLY METHODS AND SYSTEMS

BACKGROUND OF THE INVENTION

Electronic devices, such as computers and their various internal components (e.g., microprocessors, memory boards, disk drives, etc.) require power. The typical source is a 110-120 volt or 220-240 volt alternating current (AC) feed, supplied by a utility company. In many devices, the AC current is converted into direct current (DC) for use by internal components.

In instances where nonstop operation is critical, electrical devices may be fed by multiple power sources and/or provisioned with multiple power supplies to guard against inadvertent power loss. Servers and other enterprise computers are an example.

One way to supply redundant power is through multiple (usually, two) feeds from separate AC sources to the device requiring power. In this way, loss of one AC source does not force shutdown of the device. However, to ensure continuous power, the device must be equipped to switch between the AC sources quickly enough to avoid even temporary disruption, as well as to avoid spikes or other transients. Such switching circuitry can be complicated, requiring multiple relays, as well as processing logic, to detect power source failures and to effect switching. The switching and/or logic circuitry can also be expensive in monetary cost and/or in its consumption of space (e.g., within the powered device).

One object of the present invention is to provide improved power supply methods and systems.

A further object is to provide power supply methods and systems that can be implemented at low cost.

A still further object of the invention is to provide scalable power supply methods and systems.

SUMMARY OF THE INVENTION

The foregoing objects are among those attained by the invention which provides, in some aspects, a power supply that includes a first rectifier circuit configured to receive a first AC input and to generate a first DC output, a second rectifier circuit configured to receive a second AC input and to generate a second DC output, and a storage unit (e.g., a capacitor) configured to store charge from both the first DC and the second DC outputs. The storage unit can itself be configured to supply that stored charge as DC power, e.g., to a computer or other coupled device.

Related aspects of the invention provide a power supply in which at least one of the rectifiers comprises a power factor correction (PFC) circuit (though, in other aspects of the invention, other circuitry is used instead or in addition). In related aspects of the invention, the PFC circuit includes one or more circuit elements configured to place or maintain an applied input voltage and current in phase with one another.

Further related aspects of the invention provide that a PFC circuit as described above include a first inductor having an input configured to be coupled to an AC source and having an output coupled to a first switch configured to switchably couple the first inductor's output between ground and the storage unit, e.g., via a diode.

Related aspects of the invention provide such a power supply as described above including three or more rectifier circuits (e.g., PFCs) of the type described above. Each such additional rectifier circuit is configured to receive an AC input and to generate DC output for application to the storage unit.

According to further aspects, the invention provides a power supply as described above further including one or more additional diodes interposed between each rectifier (e.g., PFC) and the storage unit.

Still further aspects of the invention provide a power supply as described above including down-converter logic (such as a pulse-width modulator) that is coupled to the storage unit to deliver DC power to a load, e.g., computer components powered by the power supply.

Further aspects of the invention provide a power supply as described above that includes a first electromagnetic interference (EMI) filter configured to receive and filter power supplied by each AC input to its respective rectifier (e.g., PFC) circuit.

Related aspects of the invention provide that one of the rectifier circuits as described above is biased such that the rectifier circuits can function as a primary/secondary pair.

Further aspects of the invention provide a rack-mounted digital data apparatus having one or more modules, each including a power supply as described above. A related aspect of the invention provides a rack-mounted digital data apparatus as described above in which a plurality of the modules share AC power supplied by first and second power sources.

Related aspects of the invention provide methods for supplying power, e.g., to rack-mounted digital data processing apparatus, paralleling operation of the power supplies described above.

These and other aspects of the invention are evident in the drawings and in the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
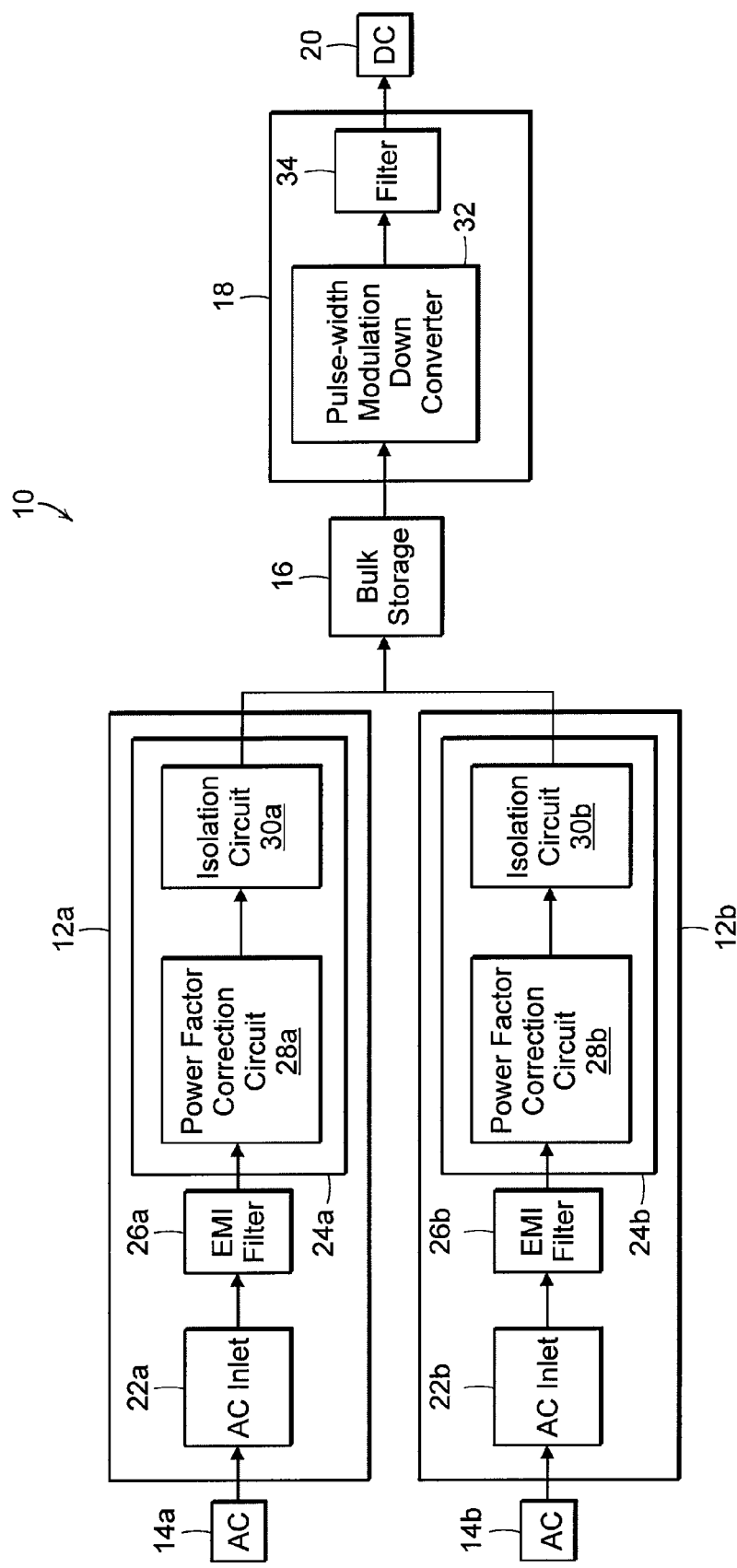
FIG. 1 is a schematic block diagram of a power supply according to the invention.

FIG. 1 illustrates a power supply 10 according to one practice of the invention. The illustrated power supply 10 includes first and second power supply front ends 12a, 12b each configured to charge a storage unit 16 from AC power received from first and second sources 14a, 14b. The storage unit 16, e.g., a bulk capacitor, releases the stored charge to a back end 18 for output 20 as DC power to one or more electronic devices—e.g., the componentry of a rack-mounted appliance of a digital data processor. The elements 12-18 are generally coupled as shown in the drawing and as discussed further below. Those skilled in the art will appreciate that the supply 10 shown in FIG. 1, and power supplies 40, 60 illustrated in FIGS. 2 and 3 and discussed below, are just examples of the invention and that other power supplies according thereto can include more or fewer elements electronically coupled together as shown, or otherwise.

Turning back to FIG. 1, the AC sources 14a, 14b are conventional sources of AC power and may represent, for example, commercially available "street" power from a utility company, a power plant, etc., accessible through an AC outlet, circuit panel, direct-to-street power cable, and so forth. The AC sources 14a, 14b are preferably sourced independently, e.g., from different utility supply lines, different building circuit panels, or so forth, to help ensure that failure in any one of the AC sources 14a, 14b "upstream" from the power supply 10 (e.g., a power cable malfunction, a building circuit breaker failure, and so forth) does not necessarily affect the other AC source 14b, 14a. The AC sources 14a, 14b may supply AC power at any frequency, typically either 50 Hz or 60 Hz, and at any voltage, typically either 110-120 V or 220-240 V.

The first and second front ends 12a, 12b are configured to receive AC power from the first and second AC sources 14a, 14b, respectively, via first and second AC inlets 22a, 22b, respectively, as shown. The first and second AC inlets 22a, 22b may comprise conventional power sockets, plugs, "pigtails" or other mechanisms, same or different from one another, configured to provide coupling for the AC power.

Preferably, one or both of the first and second AC inlets 22a, 22b are themselves coupled to their respective front ends 12a, 12b via electromagnetic interference (EMI) filters 26a, 26b, as shown, in order to (i) reduce electromagnetic interference present in the sources 14a, 14b, the inlets 22a, 22b, and/or in the environment surrounding the power supply 10, (ii) minimize EMI created by the supply 10 itself, and/or (iii) provide signal conditioning on the input power. The EMI filters 26a, 26b, which may comprise conventional EMI filters of the type known in the art, are optional and can be excluded from power supplies according to the invention.

As further shown in the drawing, the front ends 12a, 12b include rectifier circuits 24a, 24b, respectively, that convert AC power received from their associated AC inlet to DC power (for charging the bulk store 16). In the illustrated embodiment, circuits 24a, 24b comprise, respectively, first and second power factor correction (PFC) circuits 28a, 28b and, optionally, first and second isolation elements 30a, 30b, respectively, as shown. Other embodiments may use other circuit elements in place of PFC circuits 28a, 28b and/or isolation elements 30a, 30b.

The PFC circuits 28a, 28b, which are described in more detail below, place or maintain input voltage and current in phase. Additionally, one or both of the PFC circuits 30a, 30b may, optionally, provide for at least nominal charge storage, e.g., utilizing a capacitor (not shown) to insure proper biasing.

The first and second isolation elements 30a, 30b may comprise diodes or other logic to allow unidirectional current flow from their respective PFC circuits 28a, 28b to the storage unit 16 (and, conversely, to prevent backflow of that current from the storage unit to circuits 28a, 28b). In this regard, the PFC circuits 28a, 28b, themselves, may optionally include one or more diodes or other isolation elements in addition to or in place of elements 30a, 30b.

The first and second front ends 12a, 12b preferably function in a conventional primary/secondary relationship, though, they can function as a conventional load-sharing pair. When functioning as a primary/secondary pair, the front end 12a, 12b having the higher output voltage assumes most if not all of the load vis-a-vis charging store 16. In this regard, output voltages of the front ends 12a, 12b can be biased (for example, by adjustment of their respective PFC circuits 28a, 28b and/or varying the number of in-series diodes interposed between each them and the store 16) so that one of the front ends 12a, 12b normally (e.g., in absence of power fluctuation) assumes that load.

Storage unit 16 comprises a bulk capacitor or other circuit element suitable for storing charge applied by front ends 12a, 12b. In the illustrated embodiment, wherein power supply is suitable for use with both 120 and 240 volts sources 14a, 14b, the storage unit 16 supporting an operating voltage of 300-500 volts and, preferably, around 400 volts.

Back end 18 is coupled in series to bulk store 16 and generates, from the charge stored therein, DC power for application to downstream electronic device or devices. To this end, illustrated back end 18 comprises a down-converter that generates direct current suitable for the "downstream" electronic device(s), i.e., the one or more electronic devices (not shown) that are powered by the power supply 10. In the illustrated embodiment, the down-converter comprises a pulse-width modulator (PWM) 32) that generates pulses of the frequency, amplitude and duty cycle required by downstream devices. In these regards, PWM 32 comprise conventional circuitry of the type known for such purpose in the art. The DC filter 34, which is optional, may comprise a conventional DC filter as known in the art to filter, condition, or otherwise make the current generated by PWM 32 more desirable as a supply of power.

As mentioned above, the output DC power 20 is used to supply power to one or more electronic devices. The term "device" as used herein and as known in the art is intended to include any appliance, device, system, or component thereof configured to use direct current as a source of power. For example, devices can be computers, digital data processing appliances and/or their various internal components, e.g., microprocessors, memory boards, disk drives, etc.

Figure 2:
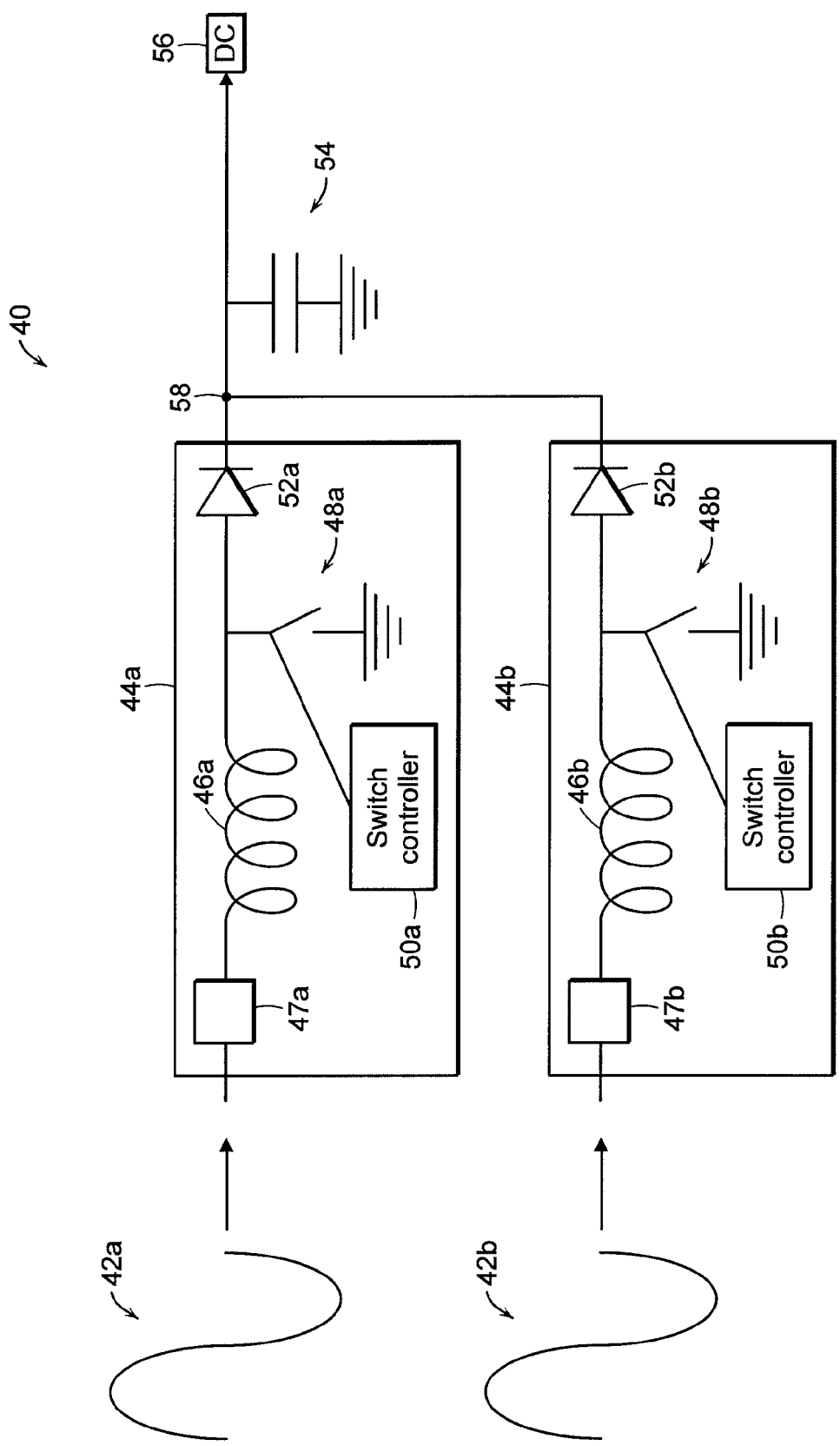
FIG. 2 is a circuit diagram of the power supply of FIG. 1.

PFC circuits 28a, 28b of the illustrated embodiment may be appreciated by reference to FIG. 2, depicting a power supply 40 according to a further practice of the invention having PFC circuits 44a, 44b that are constructed and operated similarly to PFC circuits 28a, 28b. Of course, it will be appreciated that PFC circuits of still other topologies than those shown in FIG. 2 may be used instead or in addition.

In the power supply 40, first and second AC source signals 42a, 42b are applied, respectively, to first and second inductors 46a, 46b, via first and second bridge rectifiers 47a, 47b, that collectively make up the first and second PFCs 44a, 44b, respectively, as shown. The source signals may be AC signals of the type supplied by sources 14a, 14b (of FIG. 1), of the type generated by EMI filters 26a, 26b (of FIG. 1), or otherwise. The inductors 46a, 46b are coupled to a common store 54 via diodes 52a, 52b, respectively, as shown. The inductors 46a, 46b are also switchably coupled, by way of switches 48a, 48b, to ground, as shown. Inductors 46a, 46b may be of the conventional type known in the art suitably rated for use in the illustrated power rectification application. Store 54 may be constructed and operated similarly to bulk store 16 of FIG. 1. Bridge rectifiers 47a, 47b are conventional rectifiers of the type known in the art suitably rated for use with the illustrated power factor correction circuits. Diodes 52a, 52b are conventional diodes of the type known in the art suitably rated for use in the illustrated power rectification and blocking application. As above, in some embodiments, a plurality of serially connected diodes may be substituted for one or both of illustrated diodes 46a, 46b.

Switches 48a, 48b are controlled by switch controllers 50a, 50b, as shown, all of which are of the type conventional used for power factor correction and suitably rated for use in the illustrated power rectification application. Dedicated switch controller circuits 50a, 50b are shown for each of the switches 48a, 48b, but a common switch controller can be configured to control those two switches, e.g., among others.

Each of the switches 52a, 52b is independently controlled by its respective controller so that when (i) the switch is in one position (e.g., closed) current supplied by the respective source 42a, 42b preferentially flows through the respective inductor 46a, 46b to ground, and (ii) the switch is thrown to the other position (e.g., open) current flow through the respective inductor 46a, 46b continues, causing a voltage surge at the respective diode 52a, 52b.

Contrary to convention, PFC circuits 44*a*, 44*b* of the illustrated embodiment are coupled to a common store—here, capacitor 54 (and, likewise, in respect to PFC circuits 28*a*, 28*b* of FIG. 1, to common store 16). As a consequence, when the aforementioned voltage surge occurs at either diode 52*a*, 52*b*, current flowing through the respective inductor 46*a*, 46*b* passes to that common storage unit, e.g., capacitor 54, causing it to charge up. As with bulk store 16, capacitor 54 can be used to power one or more electronic devices, e.g., preferably, through conditioning circuitry of the type provided in back-end 18 of FIG. 1.

Figure 3:
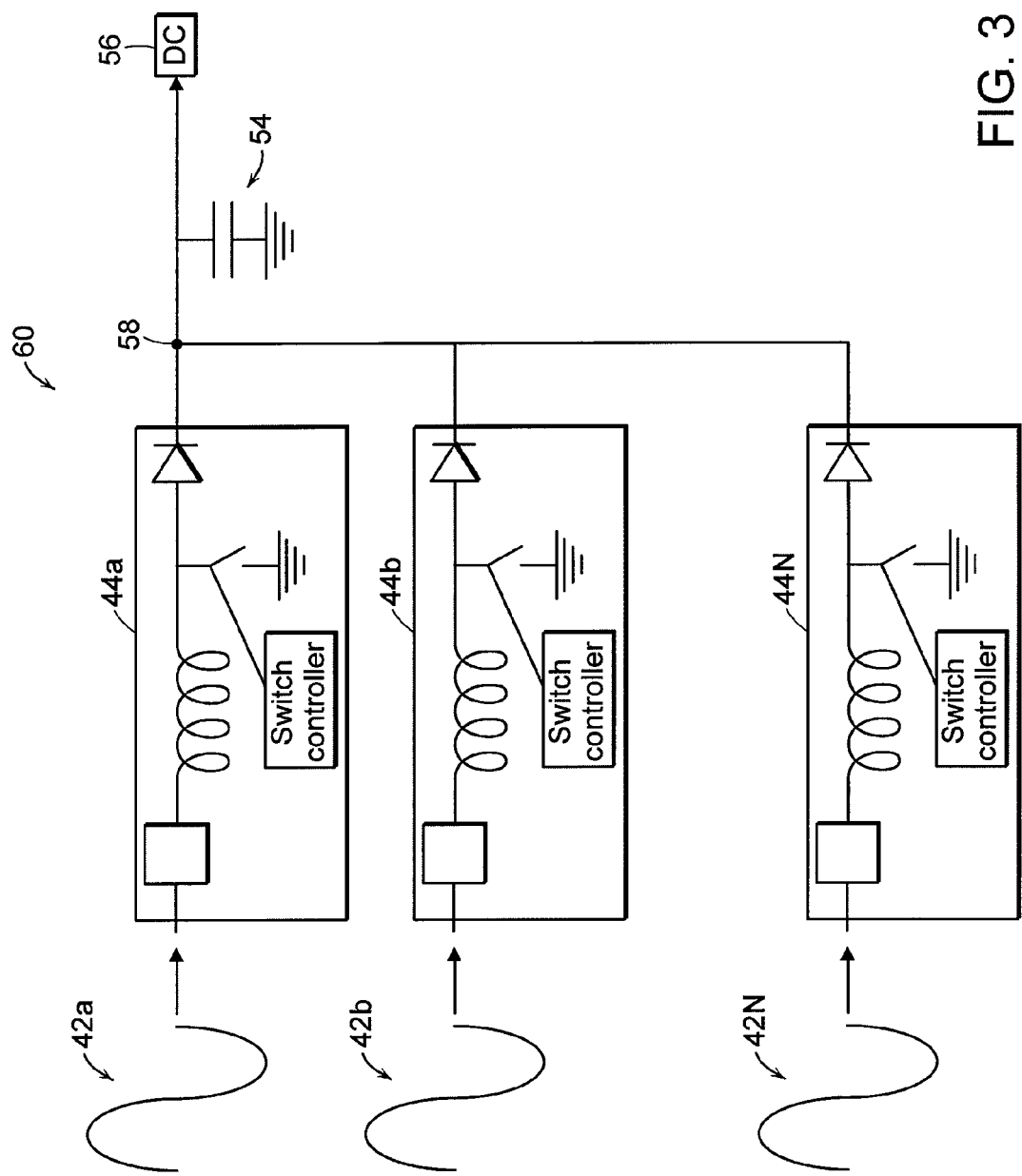
FIG. 3 depicts a variation of the circuit diagram of FIG. 2.

Of course, it will be appreciated that although FIGS. 1 and 2 show two rectifiers and/or PFCs charging a single common store 16, 54, other embodiments may employ more such rectifiers and/or PFCs for that purpose, e.g., as shown in FIG. 3, showing power supply 60 (which is configured and operated similarly to power supply 40) with "N" such PFCs.

Figure 4:
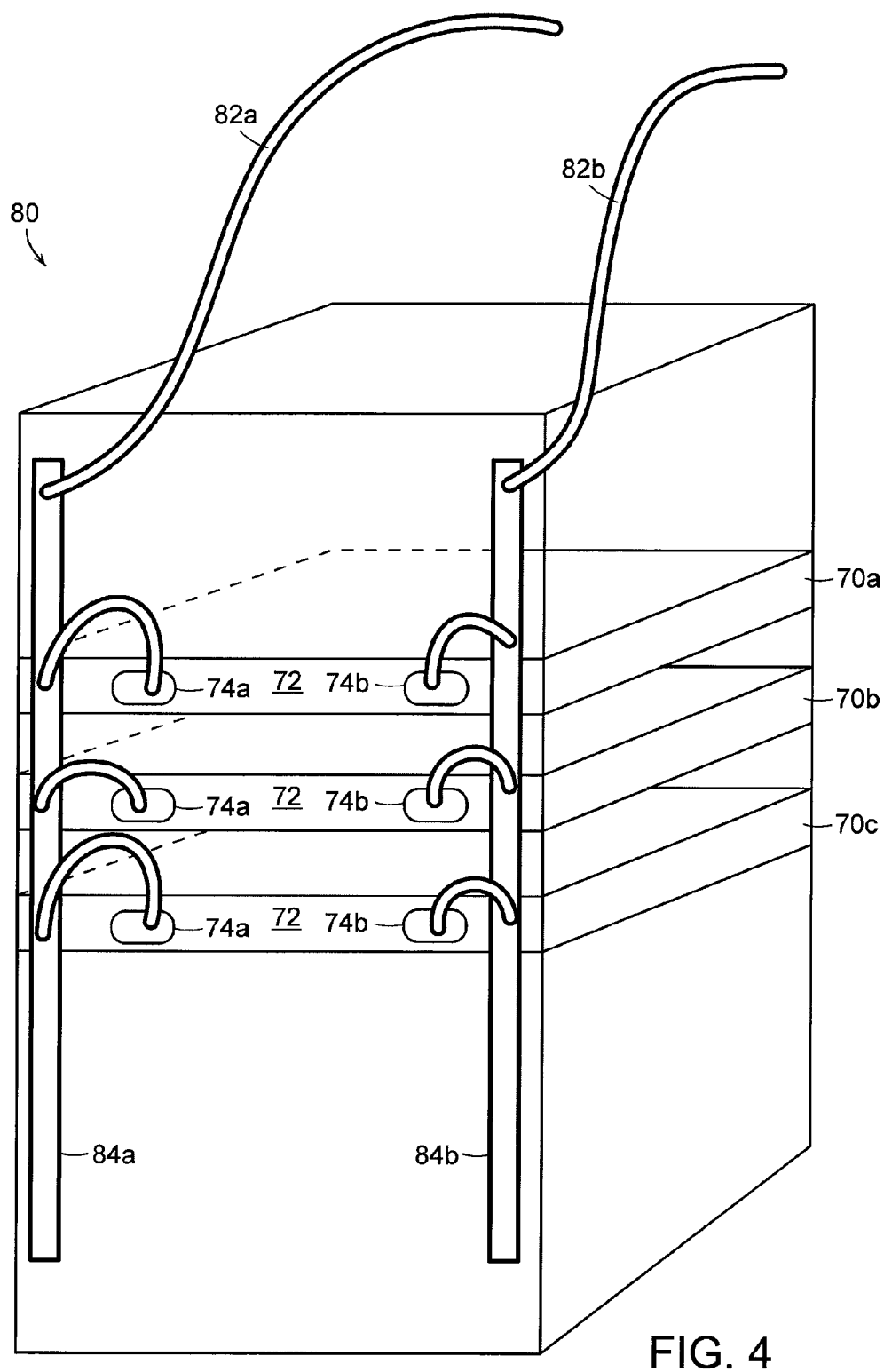
FIG. 4 depicts a plurality of rack-mounted devices utilizing power supplies according to the invention.

The power supplies discussed herein can be used in a variety of applications. According to one practice of the invention, illustrated in FIG. 4, a power supply (e.g., any of the power supplies 10, 40 or 60) is co-housed and disposed within a devices 70*a*-70*c*—here, for example, rack-mounted digital data processing appliances. Only the exteriors of devices 70*a*-70*c* is shown in the drawing. These include rear-facing panels 72 including first and second AC inlets 74*a*, 74*b*, which serve the same function as elements 22*a*, 22*b*, discussed above, and which, in this instance, comprise AC sockets. Those sockets are coupled to other elements of the respective power supplies (not shown in this drawing) that are housed within the illustrated devices 70*a*-70*c*, along with functional elements of the devices themselves (e.g., microprocessors, memory boards, disk drives, etc.) to which those power supplies provide power.

Rack 80, on which devices 70*a*-70*c* are retained comprises a conventional equipment rack of the type employed in enterprises, ISPs (internet service providers) and other organizations to retain rack-mount devices 70*a*-70*c*. Power cables 82*a*, 82*b* provide AC power to the rack (e.g., from circuit panels, "street" power lines, etc.), which is distributed by power-bus bars 84*a*, 84*b* to the respective inlets 74*a*, 74*b*, as shown Power supplies according to the invention are beneficial, among other reasons, in that they avoid the need for relays of the type used in prior art power supplies to switch between AC sources, which relays are not only expensive but difficult to properly control. In addition, devices incorporating such power supplies, e.g., equipment racks 80 of appliances 70*a*-70*c*, are fully scalable insofar as each appliance added to the rack 80 is equipped with circuitry sufficient to support its own power needs (presuming at least one of the AC sources supplying the rack remains operational).

Those skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

I claim:

1. A power supply, comprising:
   a first rectifier circuit powered by a first alternating current (AC) source to generate direct current (DC), the first rectifier circuit comprising a power factor correction (PFC) circuit;
   a second rectifier circuit powered by a second AC source to generate direct current, the second rectifier circuit comprising a power factor correction (PFC) circuit; and
   a storage unit coupled to the first and second rectifier circuits to receive and store charge therefrom.

2. The power supply of claim 1, further comprising one or more additional rectifier circuits, each of which (a) is powered by a respective additional AC source to generate direct current, and (b) generates direct current for application to the storage unit.

3. The power supply of claim 1, further comprising one or more blocking elements disposed between any of the first and second rectifier circuits and the storage unit.

4. The power supply of claim 2, wherein each one or more additional rectifier circuits comprises a power factor correction (PFC) circuit.

5. The power supply of claim 1, wherein the storage unit comprises a capacitor.

6. The power supply of claim 1, further comprising a down-converter that is coupled to the storage unit.

7. The power supply of claim 6, wherein the down-converter comprises a pulse width modulator.

8. The power supply of claim 1, further comprising a first electromagnetic interference (EMI) filter configured to receive and filter current from an AC input and to apply that filtered current to the first AC source; and
   a second EMI filter configured to receive and filter current from an AC input and to apply that current to the second AC source.

9. The power supply of claim 1, wherein the first rectifier circuit, the second rectifier circuit, and the storage unit are disposed in a rack mounted digital data processing device.

10. A power supply, comprising:
    a first power correction factor circuit having an input electrically coupled to an alternating current (AC) source and having an output electrically coupled to a storage unit;
    a second power correction factor circuit having an input electrically coupled to an AC source and having an output electrically coupled to the storage unit;
    wherein the storage unit stores charge from at least one of the power factor circuits;
    a down-converter that is electrically coupled to the storage unit and that generates therefrom direct current for application to a further device.

11. The power supply of claim 10, wherein the down-converter comprises a pulse width modulator.

12. The power supply of claim 10, wherein at least one of the power factor correction circuits comprises an inductor that is switchably coupled to the storage unit and a ground.

13. The power supply of claim 12, further comprising at least one controller configured to control opening and closing of one or more switches through which at least one of the power factor circuits is switchably coupled to the storage unit and ground.

14. The power supply of claim 13 contained within a rack-mounted digital data processing device.

15. A method of supplying power, comprising:
    receiving a plurality of alternating current (AC) inputs, each of the AC inputs being input to a different one of a plurality of rectifier circuits, wherein each of the rectifier circuits comprises a power factor correction (PFC) circuit and wherein each of the rectifier circuits converts input AC to output direct current (DC); and
    storing charge from the DC output from each of the rectifier circuits in a storage unit configured to store charge and to release stored charge to be used as a source of power for at least one component.

16. A method of supplying power, comprising:
receiving a plurality of alternating current (AC) inputs, each of the AC inputs being input to a different one of a plurality of rectifier circuits, wherein each of the rectifier circuits converts input AC to output direct current (DC); and
storing charge from the DC output from each of the rectifier circuits in a storage unit configured to store charge and to release stored charge to be used as a source of power for at least one component via a down-converter coupled to storage unit.

17. A method of supplying power, comprising:
receiving a plurality of alternating current (AC) inputs, each of the AC inputs being input to a different one of a plurality of electromagnetic interference (EMI) filters configured to receive and filter current;
applying the filtered current from each EMI filter to a different one of a plurality of rectifier circuits, wherein each of the rectifier circuits converts input AC to output direct current (DC); and
storing charge from the DC output from each of the rectifier circuits in a storage unit configured to store charge and to release stored charge to be used as a source of power for at least one component.

18. A power supply, comprising:
a first rectifier circuit powered by a first alternating current (AC) source to generate direct current (DC);
a second rectifier circuit powered by a second AC source to generate direct current;
a storage unit coupled to the first and second rectifier circuits to receive and store charge therefrom and a down-converter coupled to the storage unit.

19. The power supply of claim 18, wherein the down-converter comprises a pulse width modulator.

20. A power supply, comprising:
a first electromagnetic interference (EMI) filter configured to receive and filter current from an AC input and to apply that filtered current to a first alternating current (AC) source;
a first rectifier circuit powered by the first alternating current (AC) source to generate direct current (DC);
a second EMI filter configured to receive and filter current from an AC input and to apply that current to a second alternating current (AC) source;
a second rectifier circuit powered by the second alternating current (AC) source to generate direct current; and
a storage unit coupled to the first and second rectifier circuits to receive and store charge therefrom.

\* \* \* \* \*